DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 5, 1974

920 O.G. 6

T920,001

METHOD AND APPARATUS FOR REMOVING IODINE FROM A NUCLEAR REACTOR COOLANT

Martin H. Cooper, Monroeville, Pa., assignor to Westinghouse Electric Corporation, Pittsburgh, Pa.

Filed June 15, 1972, Ser. No. 263,054

**Int. Cl. C01b *7/14;* G21c *19/30***

U.S. Cl. 176—37

1 Sheet Drawing. 14 Pages Specification

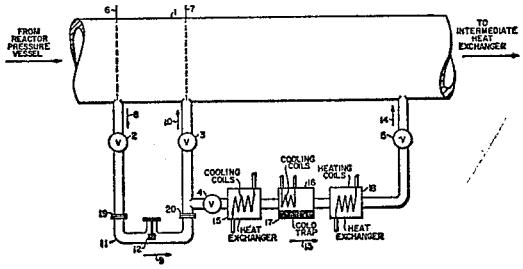

A method and apparatus for removing iodine-131 and iodine-125 from a liquid sodium reactor coolant. Non-radioactive iodine is dissolved in hot liquid sodium to increase the total iodine concentration. Subsequent precipitation of the iodine in a cold trap removes both the radioactive iodine isotopes as well as the non-radioactive iodine.

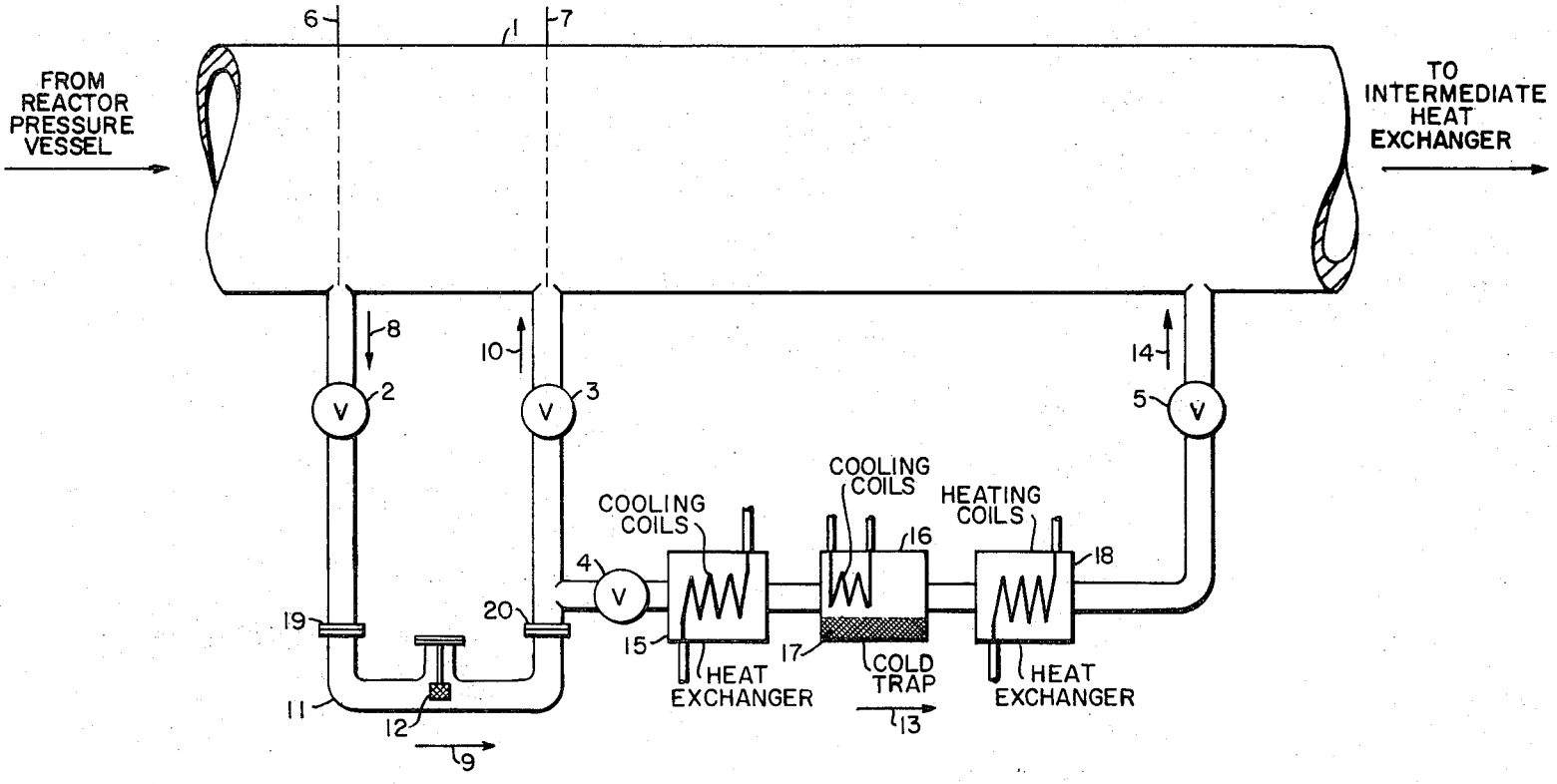

METHOD AND APPARATUS FOR REMOVING IODINE FROM A NUCLEAR REACTOR COOLANT
Filed June 15, 1972